US008094957B2

United States Patent
Huang et al.

(10) Patent No.: US 8,094,957 B2
(45) Date of Patent: Jan. 10, 2012

(54) METHOD OF MODIFYING BRIGHTNESS OF COLOR PIXELS

(75) Inventors: Ling Shiou Huang, Tainan County (TW); Shing Chia Chen, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 971 days.

(21) Appl. No.: 11/765,953

(22) Filed: Jun. 20, 2007

(65) Prior Publication Data
US 2008/0317374 A1    Dec. 25, 2008

(51) Int. Cl.
G06K 9/40    (2006.01)

(52) U.S. Cl. ........ 382/254; 382/168; 358/518; 358/521; 345/589; 345/590; 345/600; 345/603; 345/660; 348/323; 348/577; 702/88

(58) Field of Classification Search .................... None
See application file for complete search history.

(56) References Cited

U.S. PATENT DOCUMENTS

| | | | | |
|---|---|---|---|---|
| 4,500,919 | A * | 2/1985 | Schreiber ..................... | 358/518 |
| 4,812,903 | A * | 3/1989 | Wagensonner et al. ....... | 358/521 |
| 5,212,546 | A * | 5/1993 | Arazi et al. ................... | 358/518 |
| 5,333,243 | A * | 7/1994 | Best et al. ..................... | 358/1.9 |
| 5,384,601 | A * | 1/1995 | Yamashita et al. ............ | 348/577 |
| 6,057,853 | A * | 5/2000 | Siegel et al. .................. | 345/600 |
| 6,356,277 | B1 * | 3/2002 | Yajima et al. ................. | 345/603 |
| 6,476,793 | B1 * | 11/2002 | Motoyama et al. ........... | 345/589 |
| 6,766,263 | B1 * | 7/2004 | Stokes ............................ | 702/88 |
| 6,791,615 | B1 * | 9/2004 | Shiomi et al. ................. | 348/323 |
| 7,167,277 | B2 * | 1/2007 | Shimizu et al. ............... | 358/1.9 |
| 7,265,870 | B2 * | 9/2007 | Velde et al. ................... | 358/1.9 |
| 7,349,574 | B1 * | 3/2008 | Sodini et al. .................. | 382/168 |
| 7,480,419 | B2 * | 1/2009 | Finlayson ...................... | 382/254 |
| 2006/0066639 | A1 * | 3/2006 | Iwaki ............................. | 345/660 |
| 2007/0052719 | A1 * | 3/2007 | Tin ................................. | 345/590 |
| 2007/0229682 | A1 * | 10/2007 | Nishide ......................... | 348/255 |

OTHER PUBLICATIONS

Taiwanese Office Action dated Apr. 28, 2011 for 096132186, which is a Taiwanese counterpart application.

* cited by examiner

*Primary Examiner* — Anand Bhatnagar
*Assistant Examiner* — Tsung-Yin Tsai
(74) *Attorney, Agent, or Firm* — WPAT, P.C.; Anthony King

(57) ABSTRACT

An apparatus includes an extractor, a first subtractor, a second subtractor, a third subtractor, an offset generator and an adder. The extractor receives the color pixel and to provides a first, a second, and a third image value, wherein the first, the second, and the third image values are associated with the brightness of the color pixel. The first subtractor calculates a first offset between the first image value and a first expected image value. The second subtractor calculates a first difference between the first and the second image values. The third subtractor calculates a second difference between the first and the third image values. The offset generator defines a linear relation based on the first offset and the first image value, and generates a second and a third offset. The adder receives the second offset, the third offset, the second image value and the third image value to generate a second and a third expected image value.

14 Claims, 3 Drawing Sheets

METHOD OF MODIFYING BRIGHTNESS OF COLOR PIXELS

BACKGROUND OF THE INVENTION

1. Field of the Invention

The present invention relates to a method of simplifying the implementation of image processing, and more particularly to a method of modifying the brightness of color pixels.

2. Description of the Related Art

When image processing is involved, it is common practice to multiply YUV or RGB of video signals by a certain gain value. The gain value is obtained by dividing the post-process value of one parameter of YUV or RGB by its pre-process value. It is apparent that a divider is unavoidable when the above method is implemented. However, the divider is usually implemented by a look-up table (LUT), which results in inaccuracy of calculation. In addition, the error caused by the dividing process will further be amplified by a later multiplying process. Therefore, the prior method which adopts LUT needs more bits to do quantization so as to reduce the error to within an acceptable range. However, the more bits the circuit needs, the more expensive it is. Therefore, providing a new method to avoid an LUT operation is a very important issue.

SUMMARY OF THE INVENTION

The method of modifying the brightness of a color pixel in accordance with one embodiment of the present invention comprises the steps of: providing a first, a second, and a third image value, wherein the first, the second and the third image values are associated with the brightness of the color pixel; calculating a first offset between the first image value and a first expected image value; calculating a first difference between the first and the second image values, and a second difference between the first and the third image values; defining a linear relation on the basis of the first offset and the first image value; obtaining a second offset on the basis of the first difference according to the linear relation, and a third offset on the basis of the second difference according to the linear relation; and generating a second expected image value by adding the second image value and the second offset, and a third expected image value by adding the third image value and the third offset.

The method of modifying the brightness of a color pixel in accordance with one embodiment of the present invention comprises the steps of: providing a first and a second image value, wherein the first and the second image values are associated with the brightness of the color pixel; calculating a first offset between the first image value and a first expected image value; obtaining a second offset corresponding to the second image values according to the relation between the first offset and the first image value; and generating a second expected image value by adding the second image value and the second offset.

The apparatus of modifying the brightness of a color pixel in accordance with one embodiment of the present invention comprises an extractor, a first subtractor, a second subtractor, a third subtractor, an offset generator and an adder. The extractor is configured to receive the color pixel and to provide a first, a second, and a third image value, wherein the first, the second, and the third image values are associated with the brightness of the color pixel. The first subtractor is configured to calculate a first offset between the first image value and a first expected image value. The second subtractor is configured to calculate a first difference between the first and the second image values. The third subtractor is configured to calculate a second difference between the first and the third image values. The offset generator is configured to define a linear relation on the basis of the first offset and the first image value, and to generate a second and a third offset. The adder is configured to receive the second offset, the third offset, the second image value and the third image value to generate a second and a third expected image value.

BRIEF DESCRIPTION OF THE DRAWINGS

The invention will be described according to the appended drawings in which.

PREFERRED EMBODIMENT OF THE PRESENT INVENTION

Figure 1A:
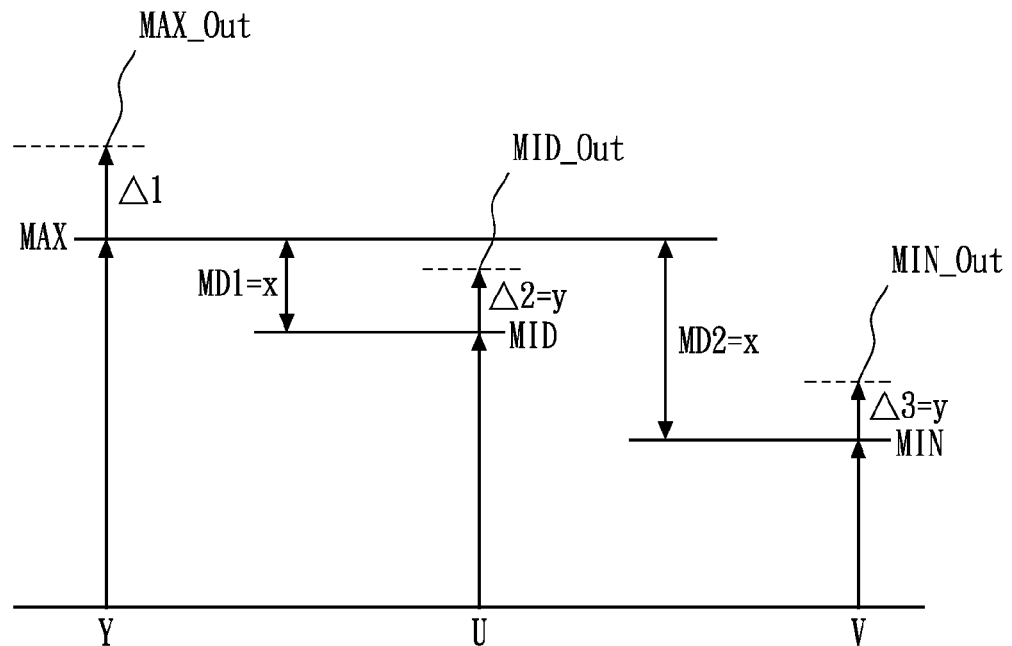
FIGS. 1(a) and 1(b) exemplify the concept in accordance with an embodiment of the present invention.
Figure 1B:
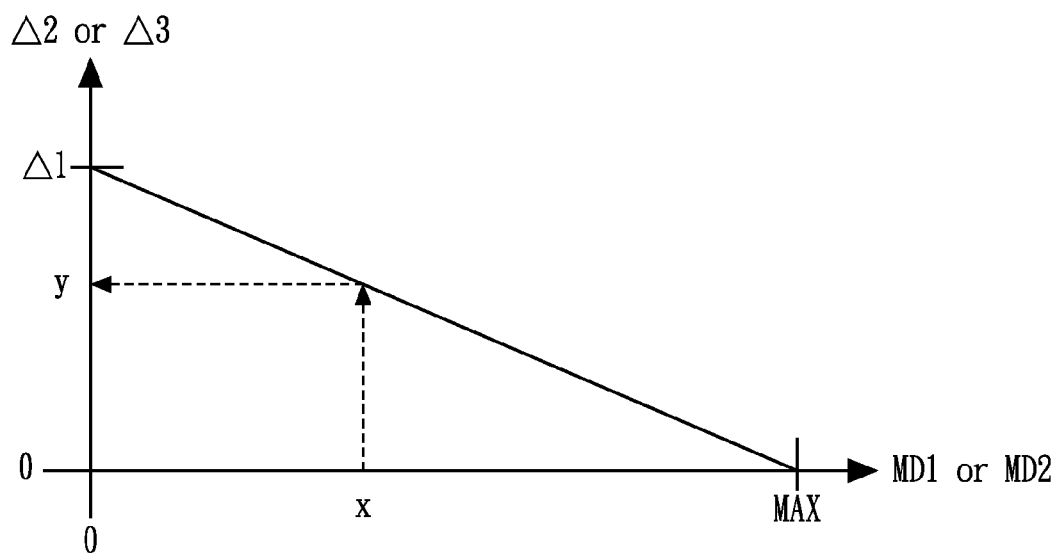

FIGS. 1(a) and 1(b) exemplify the concept in accordance with an embodiment of the present invention. Assuming that the pre-process and post-process values of the parameter Y are denoted as MAX and MAX_Out, respectively, where MAX_Out is equal to Gain×MAX. In prior art methods, the gain is pursued by dividing MAX_Out by MAX first, and then adjusting the post-process values MID_Out and MIN_Out of the parameters U and V by multiplying the pre-process values MID and MIN of the parameter U and V by such a gain. In contrast to the prior art methods, the present invention converts the multiplication operations in prior art into addition operations. Therefore, the problems of hardware complexity of the prior art divider and calculation error can be solved. Assuming that $\Delta 1$, $\Delta 2$ and $\Delta 3$ are denoted as the differences between the post-process and pre-process values of the parameters Y, U and V, respectively, and MD1 and MD2 are denoted as the differences between the pre-process values of the parameters Y and U, and between the pre-process values of the parameters Y and V, respectively. Because the enlargement ratio of the parameter Y has to be the same as that of the parameters U and V, a linear correspondence is obtained as shown in FIG. 1(b). The intercept of the X-axis is MAX, and the intercept of the Y-axis is $\Delta 1$. Assuming that x denotes MD1 or MD2, and y represents the post-process increment of the parameters U and V in accordance with the linear mapping correspondences. That is, MAX_Out is equal to MAX plus $\Delta 1$, MID_Out is equal to MID plus $\Delta 2$, and MIN_Out is equal to MIN plus $\Delta 3$. Therefore, by means of the linear interpolation or extrapolation, the present invention can reduce errors by the usage of addition only.

Figure 2:
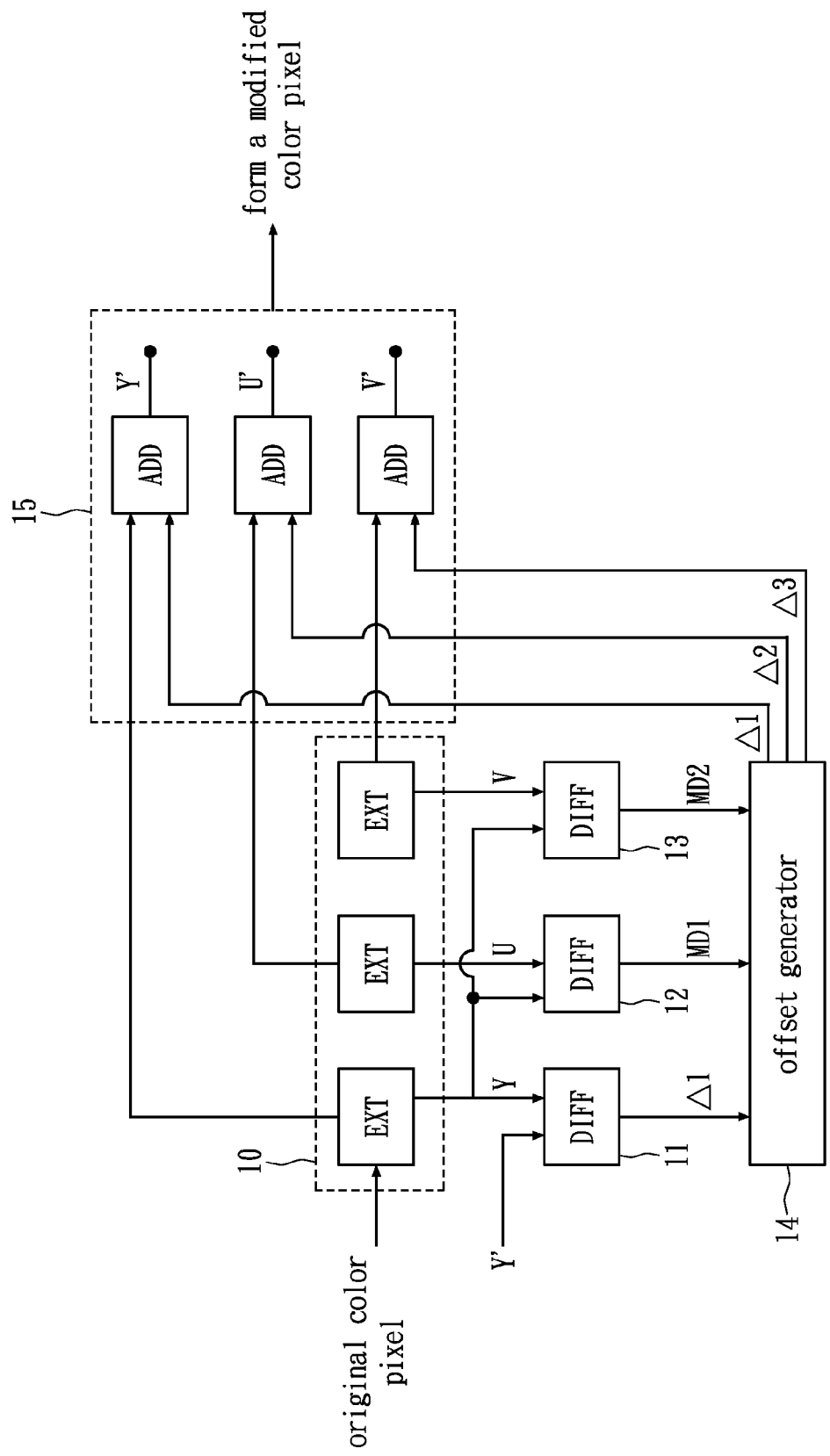
FIG. 2 shows a block diagram in accordance with an embodiment of the present invention.

FIG. 2 shows a block diagram in accordance with an embodiment of the present invention. Extractors (EXT) 10 are configured to receive the color pixel and to provide image values Y, U and V, where the image values Y, U and V are associated with the brightness of the color pixel. A first subtractor 11 receives the pre-process value Y and post-process value Y', which denotes an expected value, and is configured to calculate their difference $\Delta 1$. A second subtractor 12 is configured to calculate a first difference MD1 between the values of the parameters Y and U. A third subtractor 13 is configured to calculate a second difference MD2 between the values of the parameters Y and V. An offset generator 14 is configured to define a linear relation based on $\Delta 1$ and MAX, as shown in FIG. 1(b), and to generate a second offset $\Delta 2$ and a third offset $\Delta 3$. Adders 15 are configured to generate expected image values Y', U' and V' by adding MAX and Δ1, MID and Δ2 and MIN and Δ3.

Figure 3:
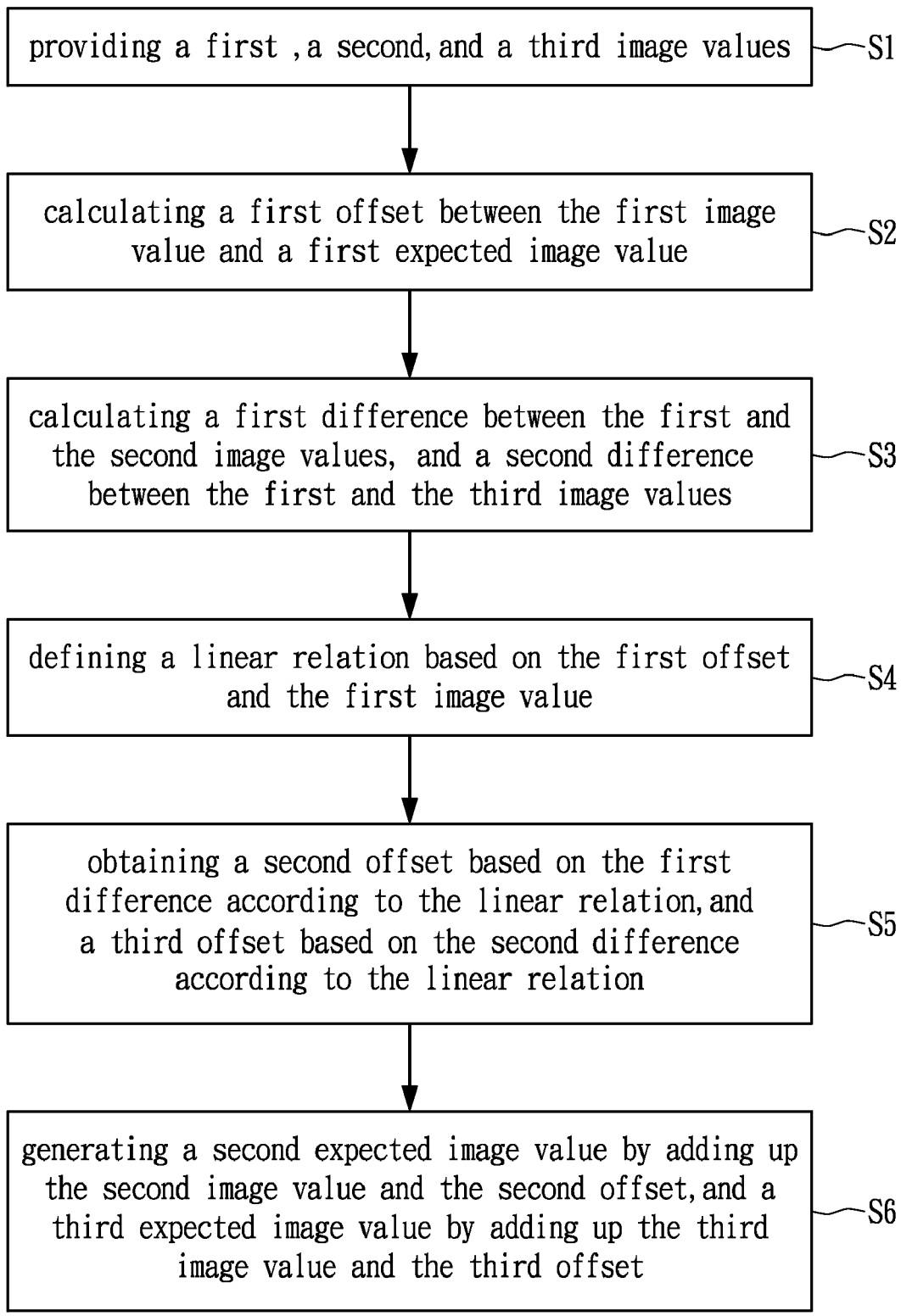
FIG. 3 shows a flow chart in accordance with an embodiment of the present invention.

FIG. 3 shows a flow chart in accordance with an embodiment of the present invention. In step S1, the values of MAX, MID, and MIN are provided, where the first, the second and the third image values are associated with the brightness of the color pixel, such as YUV or RGB. In step S2, Δ1 between MAX and MAX_Out is calculated. In step S3, MD1 and MD2 are calculated. In step S4, a linear relation based on Δ1 and MAX is defined, where Δ1 and MAX act as x-axis and y-axis intercepts of the linear relation, respectively. In step S5, Δ2 based on MD1 and Δ3 based on MD2 are obtained according to the linear relation, where Δ2 and Δ3 can be obtained by using a binary search method. In step S6, MID' is generated by adding MID and Δ2, and MIN' is generated by adding MIN and Δ3.

The above-described embodiments of the present invention are intended to be illustrative only. Numerous alternative embodiments may be devised by persons skilled in the art without departing from the scope of the following claims.

What is claimed is:

1. A method of modifying the brightness of a color pixel, applied to an image processing means, comprising the steps of:
   providing a first, a second, and a third image value, wherein the first, the second and the third image values are associated with the brightness of the color pixel;
   calculating a first offset between the first image value and a first expected image value by subtracting means only;
   calculating a first difference between the first and the second image values, and a second difference between the first and the third image values by the subtracting means only;
   defining a linear relation based on the first offset and the first image value;
   obtaining a second offset based on the first difference according to the linear relation, and a third offset based on the second difference according to the linear relation by an adding means only; and
   generating a second expected image value by adding the second image value and the second offset, and a third expected image value by adding the third image value and the third offset,
   wherein the linear relation reflects an enlargement ratio, and the enlargement ratio is the same among the first offset, the second offset and the third offset.

2. The method of modifying the brightness of a color pixel of claim 1, wherein the first, the second, and the third image values refer to a YUV color model.

3. The method of modifying the brightness of a color pixel of claim 1, wherein the linear relation is characterized by the first image values and the first offset as x-axis and y-axis intercepts, respectively.

4. The method of modifying the brightness of a color pixel of claim 1, wherein the obtaining step comprises the steps of:
   locating the first and the second differences using a binary search method; and
   locating the second and the third offsets using the binary search method.

5. An apparatus of modifying the brightness of a color pixel, comprising:
   an extractor configured to receive the color pixel and to provide a first, a second, and a third image value, wherein the first, the second, and the third image values are associated with the brightness of the color pixel;
   a first subtractor coupled to the extractor configured to calculate a first offset between the first image value and a first expected image value;
   a second subtractor coupled to the extractor configured to calculate a first difference between is the first and the second image values;
   a third subtractor coupled to the extractor configured to calculate a second difference between the first and the third image values;
   an offset generator configured to define a linear relation based on the first offset and the first image value, and to generate a second and a third offset; and
   an adder configured to receive the second offset, the third offset, the second image value and the third image value to generate a second and a third expected image value,
   wherein the apparatus do not have a multiplier or a divider,
   wherein the linear relation reflects an enlargement ratio, and the enlargement ratio is the same among the first offset, the second offset and the third offset.

6. A method of modifying the brightness of a color pixel, applied to an image processing means, comprising the steps of:
   providing a first and a second image value, wherein the first and the second image values are associated with the brightness of the color pixel;
   calculating a first offset between the first image value and a first expected image value by subtracting means only;
   obtaining a second offset corresponding to the second image value according to a relation between the first offset and the first image value by the subtracting means only; and
   generating a second expected image value by adding the second image value and the second offset by an adding means only,
   wherein the relation reflects an enlargement ratio, and the enlargement ratio is the same between the first offset and the second offset.

7. The method of modifying the brightness of a color pixel of claim 6, wherein the obtaining step further comprises the step of:
   calculating a first difference between the first and the second image values.

8. The method of modifying the brightness of a color pixel of claim 7, wherein the obtaining step comprises the step of:
   obtaining the second offset based on the first difference according to the relation.

9. The method of modifying the brightness of a color pixel of claim 8, wherein the obtaining step further comprises the steps of:
   locating the first difference in the relation using a binary search method; and
   determining the second offset according to the location of the first difference.

10. The method of modifying the brightness of a color pixel of claim 9, wherein the obtaining step comprises the step of:
    obtaining a third offset corresponding to the third image value according to a relation between the first offset and the first image value.

11. The method of modifying the brightness of a color pixel of claim 10, wherein the obtaining step further comprises the step of:
    calculating a second difference between the first and the third image values.

12. The method of modifying the brightness of a color pixel of claim 6, wherein the providing step comprises the step of:

provinding a third image value associated with the brightness of the color pixel.

13. The method of modifying the brightness of a color pixel of claim 12, wherein the generating step comprises the step of:

generating a third expected image value by adding up the third image value and the third offset.

14. The method of modifying the brightness of a color pixel of claim 13, wherein the obtaining step comprises the step of:

obtaining the third offset based on the second difference according to the relation.

* * * * *